United States Patent [19]

Gerassimov et al.

[11] Patent Number: 4,991,561
[45] Date of Patent: Feb. 12, 1991

[54] GAS-AIR MIXER

[75] Inventors: Milen B. Gerassimov; Stojtscho Dimitrov; Zonjo I. Petkov, all of Ruse, Bulgaria

[73] Assignee: N I S pri VTU "Angel Kantschev", Ruse, Bulgaria

[21] Appl. No.: 473,774

[22] Filed: Feb. 2, 1990

[51] Int. Cl.$^5$ .............................................. F02B 43/00
[52] U.S. Cl. .................... 123/527; 48/180.1; 123/590
[58] Field of Search ............... 123/525, 527; 48/180.1, 48/189.4

[56] References Cited

U.S. PATENT DOCUMENTS

| 4,058,102 | 11/1977 | Fabritz | 123/590 |
| 4,280,968 | 7/1981 | Smeets | 123/525 |
| 4,440,137 | 4/1904 | Lagano et al. | 123/527 |
| 4,479,466 | 10/1984 | Greenway et al. | 123/527 |
| 4,660,525 | 4/1987 | Mesman | 123/525 |
| 4,664,089 | 5/1987 | Pommer et al. | 123/590 |
| 4,872,440 | 10/1989 | Green | 48/189.4 |

Primary Examiner—E. Rollins Cross
Attorney, Agent, or Firm—Klein & Vibber

[57] ABSTRACT

A gas-air mixer for internal combustion engines having an inlet and an outlet diffusor and being mounted in a collar member which forms a cyclindrical surface between them. Feeding channels are disposed between the inlet and outlet diffusors which terminate at the external side of the diffusors in a concentrically shaped annular channel. Both diffusors are constructed as separate bushings. The outlet diffusor is fixedly mounted in the collar and the inlet diffusor is movably mounted in the collar, around its axis by means of a control lever. The diffusors are seated end face to end face and an outer cylindrical surface mutually defined by them through which have been cut radial slots form feeding channels for gas fuel. By turning of said diffusors with respect to each other the cross-section of the feeding channels is adjusted depending on the angle of rotation of the inlet diffusor around its axis different operating regimes of the engine.

The air-gas mixer is used in engine construction and in particular for gas-diesel internal combustion engines.

2 Claims, 2 Drawing Sheets

GAS-AIR MIXER

BACKGROUND OF THE INVENTION

The invention refers to a gas-air mixer that is used in engine manufacture and in particular for gas-diesel internal combustion engines.

There is already known a gas-air mixer comprising a body having a cylindrical opening, on both sides of which there are disposed coaxially an inlet and outler diffusor. There are uniformly disposed along the circumference of the cylindrical opening a plurality of channels connected through a concentric annular channel around the body with a delivery conduit for gas fuel. A disadvantage of such a known mixer is that it does not adequately provide a timely and proportional dosing of the gas fuel during all operatinq regimes of the engine due to the separate design in the gas feeding system of a dosing device for the gas-air mixer.

SUMMARY OF THE INVENTION

The object of the invention is to provide for a gas-air mixer that ensures an uniform mixing of the gas fuel and the air while implementing at the same time the function of a dosing unit so that the mixer effects a timely and proportional dosing of gas fuel at all operating regimes of the engine.

This object is accomplished by a gas-air mixer which comprises an inlet and an outlet diffusor which are connected with a cylindrical surface shaped between them on which are disposed feeding channels terminating at the external side of the diffusors in a concentrically shaped annular channel which is connected to a delivery conduit for gas fuel.

According to the invention the inlet and the outlet diffusors are constructed as separate bushings, whereas the inlet diffusor is fixed and the outlet diffusor is turned by a control lever around its axis. Both disffusors are seated and packed, one against the other respectively, along an inner and an outer cylindric surface through which there have been cut the respective radial slots in the overlapping of which are formed feeding channels for gas fuel with a variable section depending on the angle of turning of the inlet diffusor around its axis at different working regimes of the engine.

The advantages of the novel gas-air mixer of this invention are that it provides for a high-quality formation of the mixture at all working regimes of the engine due to timely and proportional dosing of gas fuel with the sucked air as a result of unifying the dosing unit and the gas-air mixer of the gas feeding system and their simultaneous operation.

BRIEF DESCRIPTION OF THE DRAWING

For an understanding of the principles of the invention, reference is made to the following description of typical embodiments thereof as illustrated in the accompanying drawings in which.

DETAILED DESCRIPTION

Figure 1:
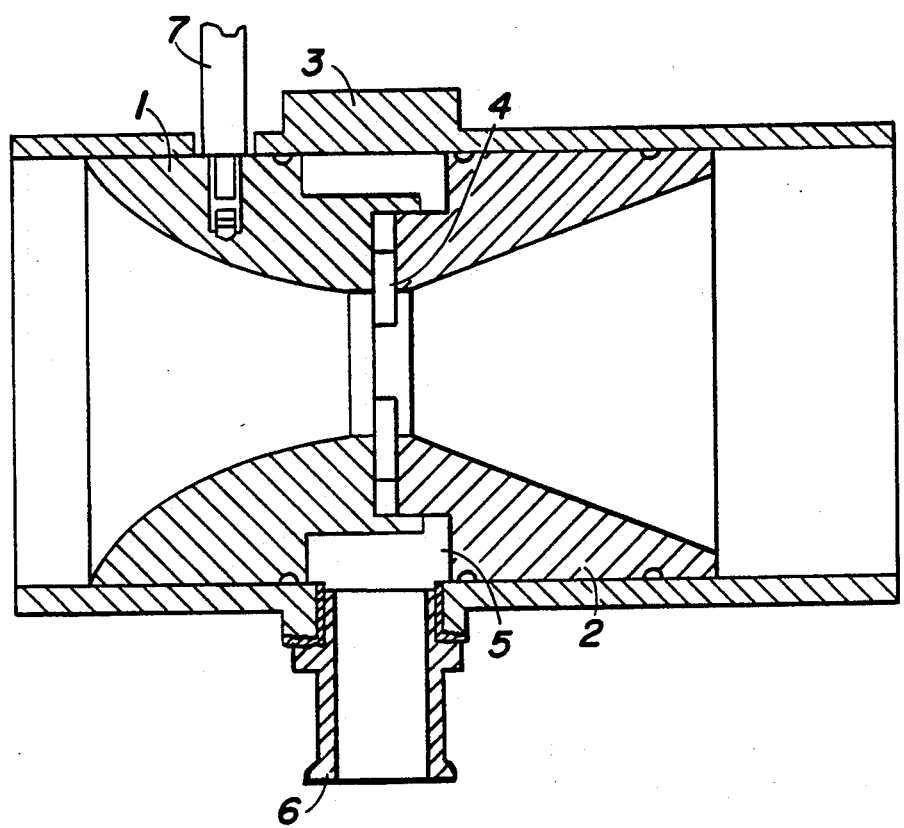
FIG. 1 is a longitudinal cross-section of the gas-air mixer.
Figure 2A:
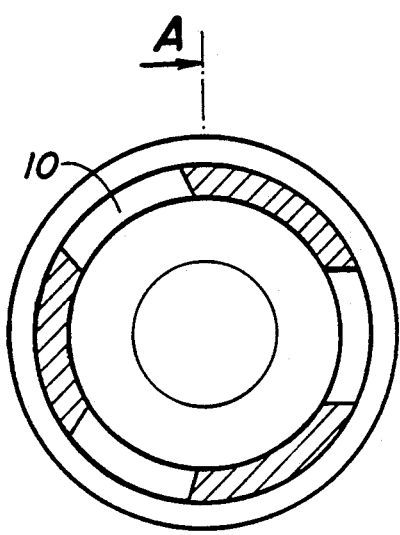
FIG. 2A is a transverse cross-sectional view of the gas-air, outlet diffusor.
Figure 2B:
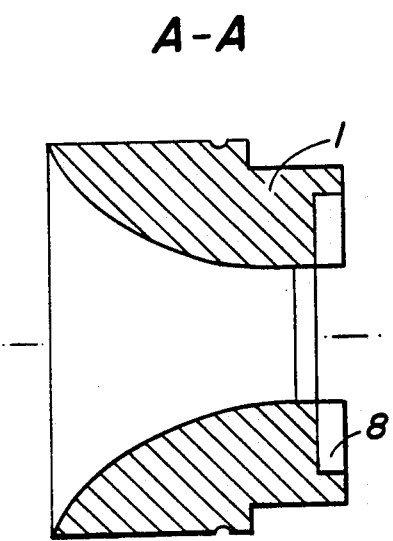
FIG. 2B is a longitudinal cross-sectional view of the outlet diffusor along line A—A of FIG. 2A.
Figure 3A:
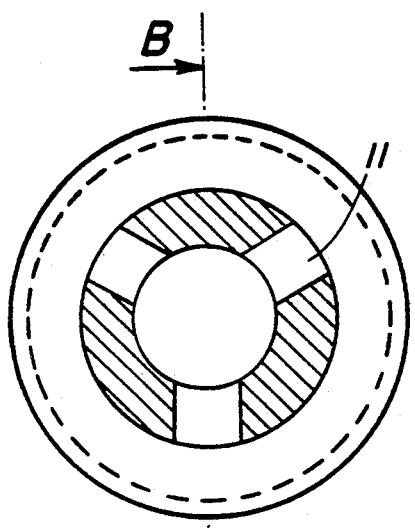
FIG. 3A is a transverse cross-sectional view of the gas-air inlet diffusor.
Figure 3B:
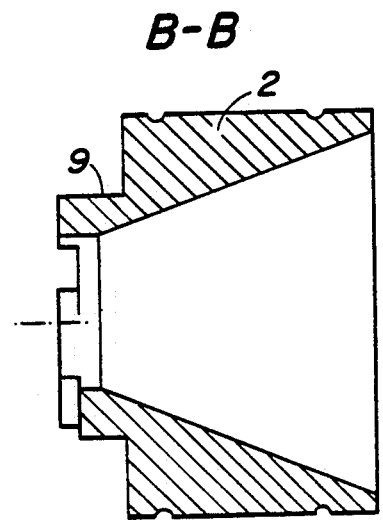
FIG. 3B is a cross-sectional view of the inlet diffusor along line B—B of FIG. 3A.

The gas-air mixer comprises an inlet diffusor 1 and an outlet diffusor 2 designed as separate bushings. A cylindrical collar 3 for the diffusors 1 and 2. This collar 3 is disposed between the two assembled diffusors and envelops both diffusors 1 and 2. There are formed in the collar 3 uniformly shaped feeding channels 4 which terminate at the external side in a concentrically shaped annular channel 5 around the diffusors 1 and 2, and these feeding channel 4 are connected to a supply conduit 6 for gas fuel. The outlet diffusor 2 is fixedly mounted in the collar 3 while the inlet diffusor 1 can be turned by means of a control lever 7 around its axis. The inlet diffusor 1 and the outlet diffusor 2 are seated and packed one against the other respectively, along an inner surface 8 and an outer cylindrical surface 9 through which have been cut respective radial slots 10 and 11. These slots 10 and 11 overlap and form feeding channels 4 for the gas fuel having a variable cross-section depending on the rotation angle of the inlet diffusor 1 around its axis at different operating regimes of the engine.

Manner of Operation

The device operates as follows: under working conditions of the engine liquid and gaseous fuel is being fed to the cylinders through a fuel feeding pump: a portion of liquid fuel is used for ignition. The basic portion of fuel is provided by sucking of gaseous fuel passing through the feeding channels 4, formed by the radial slots 10 and 11 respectively at the inlet diffusor 1 and the outlet diffusor 2. In rotating the inlet diffusor 1 by means of the control level 7 with respect to the immovable outlet diffusor 2 there is achieved a partial or complete overlapping of the radial slots 10 and 11 which jointly form the feeding channels 4 with a variable cross-section. By means of the channel 4 there is regulated the amount of gaseous fuel which is required to be added to the sucked air depending on the operating regime of the engine.

While a specific embodiment of the invention has been shown and described in detail to illustrate the application of the principles of the invention, it will be understood that the invention may be embodied otherwise without departing from such principles.

We claim:

1. An improved gas-air mixer for an internal combustion engine, comprising in combination, an inlet and an outlet diffusor coaxially arranged with respect to each other, and a collar member which includes a cylindrical surface formed between the inlet and outlet diffusor, said inlet and outlet diffusors and collar member jointly defining feeding channels means terminating at the outer side of the diffusors in a concentrically shaped annular channel which is connected to supply conduit means for gaseous fuel, said inlet diffusor and said outlet diffusor are constructed as separate bushings, whereby said outlet diffusor is fixedly mounted in said collar member and said inlet diffusor is movably mounted in said collar member around its axis by means of a control lever, said inlet diffusor and said outlet diffusor are seated and packed in said collar member one against the other, along an inner cylindrical surface formed by one of said diffusors and an outer cylindrical surface formed by another one of said diffusors, said inner and outer cylindrical surfaces having cut radial slots which at least partially form said feeding channels means for gaseous fuel having an adjustable cross-section which depends on the angle of rotation of the inlet diffusor around its axis at different operating regimes of said engine.

2. The improvement in a gas-air mixer as set forth in claim 1, wherein said internal combustion engine is a diesel engine.

* * * * *